US009100668B2

(12) United States Patent
Lehrer

(10) Patent No.: US 9,100,668 B2
(45) Date of Patent: Aug. 4, 2015

(54) GRAPHICS CORRECTION ENGINE

(76) Inventor: Matthew Nathan Lehrer, Carlsbad, CA (US)

( * ) Notice: Subject to any disclaimer, the term of this patent is extended or adjusted under 35 U.S.C. 154(b) by 231 days.

(21) Appl. No.: 13/484,649

(22) Filed: May 31, 2012

(65) Prior Publication Data

US 2013/0322776 A1 Dec. 5, 2013

(51) Int. Cl.
*G06K 9/40* (2006.01)
*H04N 21/2343* (2011.01)
*G06T 5/00* (2006.01)
*G06F 17/30* (2006.01)
*H04L 29/06* (2006.01)
*H04N 21/2743* (2011.01)

(52) U.S. Cl.
CPC ...... *H04N 21/2343* (2013.01); *G06F 17/30247* (2013.01); *G06T 5/009* (2013.01); *H04L 65/604* (2013.01); *H04L 65/80* (2013.01); *H04N 21/2743* (2013.01)

(58) Field of Classification Search
CPC ................. G06F 17/30247; G06T 5/009
See application file for complete search history.

(56) References Cited

U.S. PATENT DOCUMENTS

| 7,016,865 | B1 * | 3/2006 | Weber et al. ................. 705/26.5 |
| 7,016,869 | B1 * | 3/2006 | Haeberli ...................... 705/27.2 |
| 7,216,092 | B1 * | 5/2007 | Weber et al. ................. 705/26.5 |
| 8,502,834 | B2 * | 8/2013 | Hanechak et al. ............ 345/592 |
| 2005/0104897 | A1 * | 5/2005 | Walker et al. ................. 345/620 |
| 2005/0281535 | A1 * | 12/2005 | Fu et al. .......................... 386/69 |
| 2006/0197963 | A1 * | 9/2006 | Royal et al. .................... 358/1.2 |
| 2007/0061224 | A1 * | 3/2007 | Hofmann et al. ............... 705/27 |
| 2008/0163069 | A1 * | 7/2008 | Eilers ........................... 715/744 |
| 2009/0180153 | A1 * | 7/2009 | Noonan ....................... 358/3.29 |
| 2011/0025714 | A1 * | 2/2011 | Ptucha et al. ................. 345/641 |

* cited by examiner

*Primary Examiner* — Stephen R Koziol
*Assistant Examiner* — Jonathan S Lee
(74) *Attorney, Agent, or Firm* — James M Smedley LLC; James M. Smedley, Esq.

(57) ABSTRACT

The present invention generally relates to graphic correction systems and methods. In particular, embodiments of the invention are directed to systems and methods configured to test the quality of images or other multimedia content uploaded to a web-based application and automatically performing corrections and conversions to the image or other multimedia content based at least in part on the results of the quality test.

18 Claims, 5 Drawing Sheets

GRAPHICS CORRECTION ENGINE

FIELD OF THE INVENTION

The present invention generally relates to graphic correction systems and methods. In particular, embodiments of the invention are directed to systems and methods configured to test the quality of images or other multimedia content uploaded to a web-based application and automatically performing corrections and conversions to the image or other multimedia content based at least in part on the results of the quality test.

BACKGROUND

Currently, when uploading an image, such as a picture or illustration saved in a computer readable format (e.g., jpg, giff, bmp, png, tiff), to a product design website or other electronic medium (e.g., e-mail, ftp server), the receiving systems do not provide production information on the image received. These systems, as utilized in the product design industry, are dumb systems, configured only to receive images with little or no comment or concern as to the properties or characteristics of the received images.

While certain configurator systems for product design websites (such as those used by Café Press, Zazzle, Spreadshirt, and Shutterfly) allow the uploading of graphics, no information is provided at the time of upload regarding the properties of the graphics and usability of the graphics in production of the desired products. When a designer then selects the graphic for use, the system will use the size of the original upload. For example if a file is small in size, such as a 52 kb image in 72 dpi, the resulting image displayed will be quite small. If the designer wishes to increase the size of the image by selecting the edit arrow and extending the size of the image, an error message will be displayed. This message notes that if the image is made larger it will not meet minimum print standards, and if images are not adjusted back to original size they may be blurry or pixilated.

While notifications to the user, in form of error messages or other notification means, are commonplace, they do nothing to correct the failings identified by these systems. As image correction can be a complicated problem, one that is out of the realm of many computer users, having a system simply identify that an image is not usable for the desired purpose does little to instruct or assist the user in getting the image into appropriate form for use by the system. As such, potential customers may be dissuaded or altogether incapable of utilizing the systems currently available as the users may lack the ability to correct errors or other problems with the images in order to make the image appropriate for use by the system.

Therefore, there is need in the art for a graphics correction engine capable of testing the quality of images or other multimedia content and automatically performing corrections and conversions on the images or other multimedia content. These and other features and advantages of the present invention will be explained and will become obvious to one skilled in the art through the summary of the invention that follows.

SUMMARY OF THE INVENTION

Accordingly, it is an aspect of the present invention to provide a graphics correction engine capable of testing the quality of images or other multimedia content and automatically performing corrections and conversions on the images or other multimedia content.

According to an embodiment of the present invention, a web-based graphics correction engine includes: a content testing module comprising computer-executable code stored in non-volatile memory; a content processing module comprising computer-executable code stored in non-volatile memory; a communications means comprising computer-executable code stored in non-volatile memory, wherein said content testing module, said content processing module and said communications means are operably connected; and wherein the content testing module, content processing module and communications means are configured to collectively perform the steps of: receiving a content upload, from a user, at a graphics correction engine, wherein said graphics correction engine comprises computer-executable code stored in non-volatile memory and a processor; storing, in said graphics correction engine, content associated with said content upload; determining, at said graphics correction engine, one or more properties of said content; determining threshold information, based at least in part on threshold information stored in said graphics correction engine; analyzing said properties as they relate to said threshold information; and transmitting feedback, from said graphics correction engine, to said user, wherein said feedback is based at least in part on said analysis.

According to an embodiment of the present invention, the content comprises an image.

According to an embodiment of the present invention, the content testing module, content processing module and communications means are additionally configured to collectively perform the step of determining if said content is in an appropriate format.

According to an embodiment of the present invention, the content testing module, content processing module and communications means are additionally configured to collectively perform the step of determining if said content is in an appropriate transparency.

According to an embodiment of the present invention, the content testing module, content processing module and communications means are additionally configured to collectively perform the step of storing said properties in memory.

According to an embodiment of the present, invention the threshold information is retrieved from a data store.

According to an embodiment of the present invention, the analyzing step is configured to check if said properties meet a minimum threshold of said threshold information.

According to an embodiment of the present invention, the analyzing step is configured to check if said properties exceed a maximum threshold of said threshold information.

According to an embodiment of the present invention, the feedback is provided to the user in the form of a webpage.

According to an embodiment of the present invention, a web-based method for providing graphics correction includes the steps of: receiving a content upload, from a user, at a graphics correction engine, wherein said graphics correction engine comprises computer-executable code stored in non-volatile memory and a processor; storing, in said graphics correction engine, content associated with said content upload; determining, at said graphics correction engine, one or more properties of said content; determining threshold information, based at least in part on threshold information stored in said graphics correction engine; analyzing said properties as they relate to said threshold information; and transmitting feedback, from said graphics correction engine, to said user, wherein said feedback is based at least in part on said analysis.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to graphic correction systems and methods. In particular, embodiments of the invention are directed to systems and methods configured to test the quality of images or other multimedia content uploaded to a web-based application and automatically performing corrections and conversions to the image or other multimedia content based at least in part on the results of the quality test.

Figure 1:
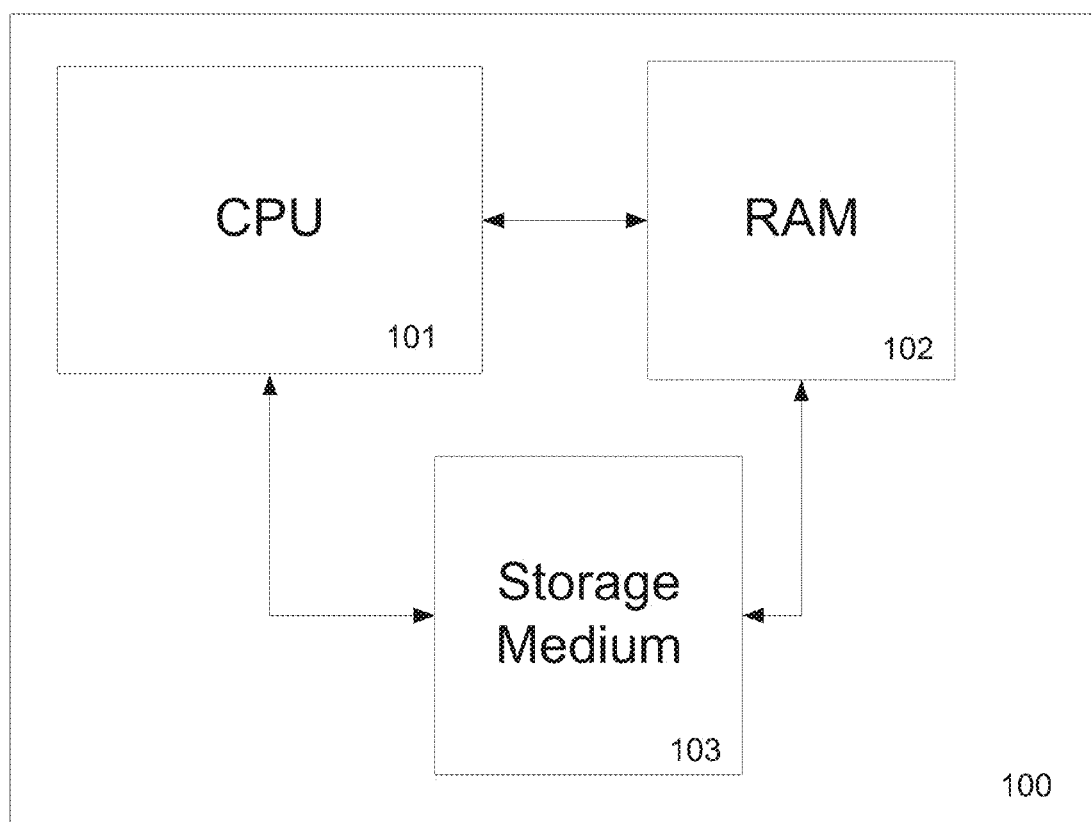
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, and a storage medium (e.g., hard disk drive, solid state drive, flash memory, cloud storage) 103. Examples of computing devices usable with embodiments of the present invention include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
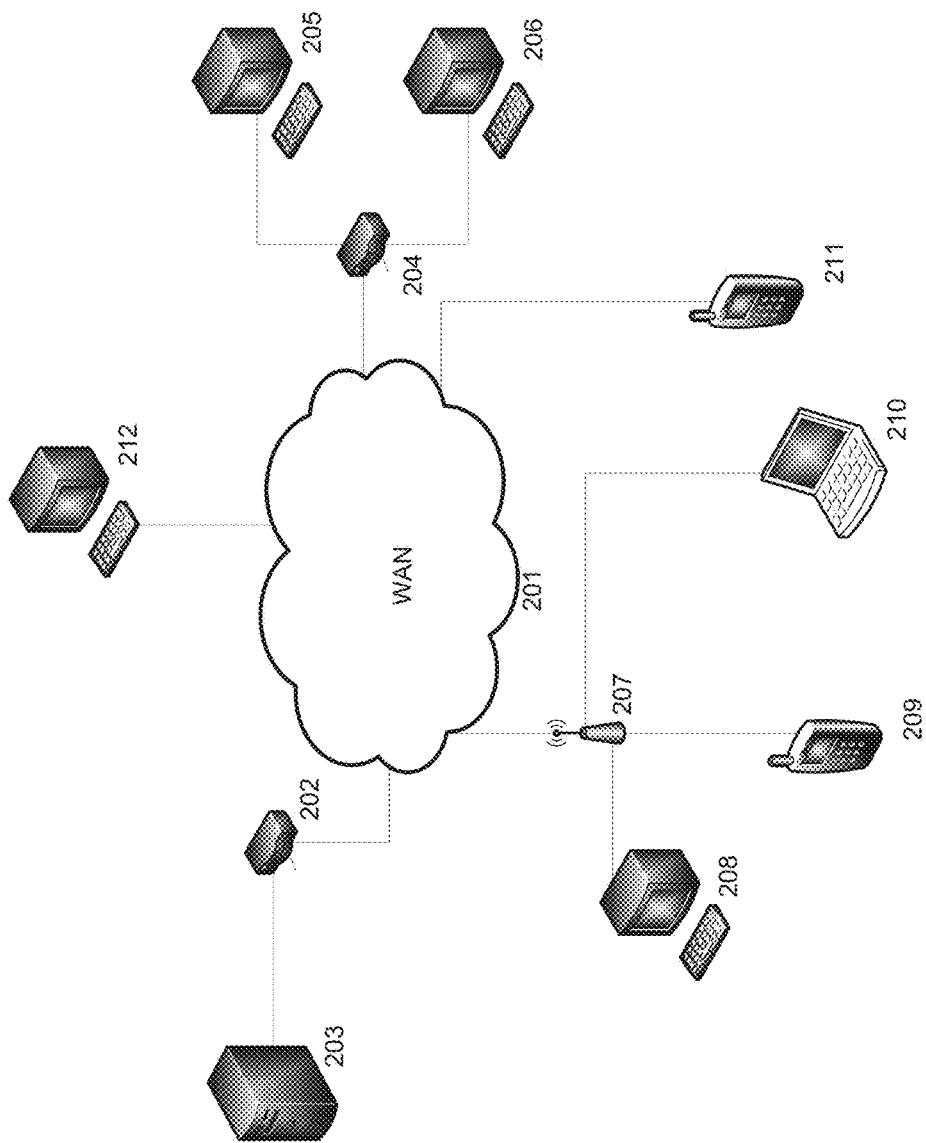
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

According to an embodiment of the present invention, the graphics correction engine is comprised of a web-based system that offers enhanced functionality by providing greater detail regarding uploaded images or other multimedia content and the quality thereof, as well as a conversion option to adjust the uploaded images or other multimedia content as needed. Images and multimedia content may include, but is not limited to image files (e.g., JPG, GIF, PNG, BMP), video files (e.g., MOV, DVIX, AVI, MP4), audio files (e.g., WAV, MP3) or any other multimedia format, including any combination of the foregoing. One of ordinary skill in the art would appreciate that embodiments of the present invention could be utilized with any number of file types and formats, and embodiments of the present invention are contemplated for use with any file type and format.

Figure 3:
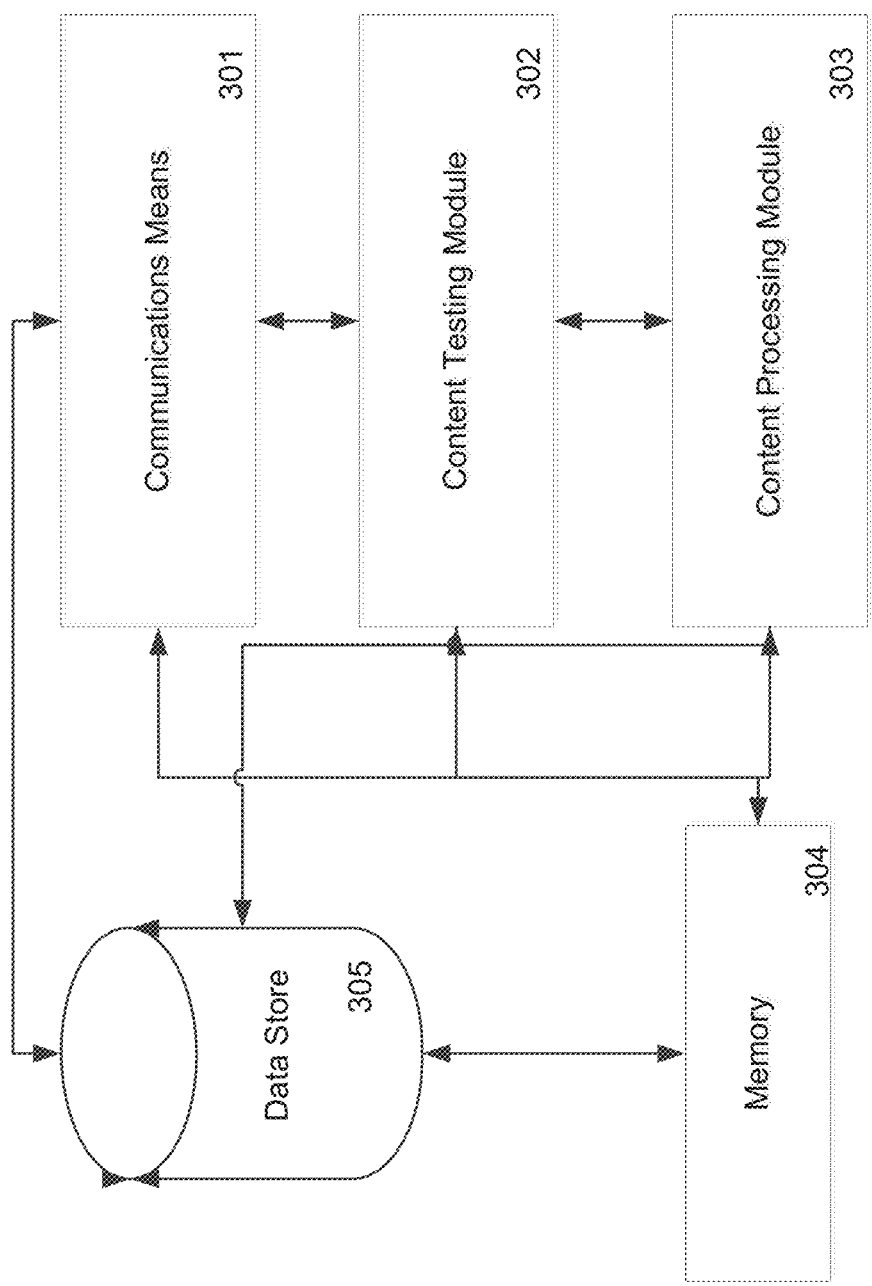
FIG. 3 is a schematic of a graphics correction engine, in accordance with an embodiment of the present invention.

Turning now to FIG. 3, an exemplary embodiment of the graphics correction engine is shown. In this embodiment, the graphics correction engine includes a communications means 301, a content testing module 302, a content processing module 303, a non-transitory memory module 304 and a data store 305. While the embodiment shown in FIG. 3 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the communications means of the graphics correction engine may be, for instance, any means for communicating data over one or more networks. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the content testing module may be comprised of computer-executable code stored in non-transitory memory and a processing means (e.g., CPU) configured to process the computer-executable code. The content testing module is configured to test various properties of the content received from users. Properties to be tested by the content testing module include, but are not limited to, size, color, transparency, resolution, positioning, layering, sharpness, inclusion of human readable text (e.g., OCR) or any combination thereof. One of ordinary skill in the art would appreciate that there are numerous properties that could be utilized with embodiments of the present invention, and embodiments of the present invention are contemplated for use with any type of property.

According to an embodiment of the present invention, the content processing module may be comprised of computer-executable code stored in non-transitory memory and a processing means (e.g., CPU) configured to process the computer-executable code. The content processing module is configured to alter various properties of the content received from users. Alteration of the various properties may be automated and may include extrapolation, interpolation, noise reduction, color enhancing, enlarging of content, shrinking of content, format changes and any combination thereof. One of ordinary skill in the art would appreciate that there are numerous properties that may be altered by the content processing module, and embodiments of the present invention are contemplated for use in altering any content property.

Figure 4:
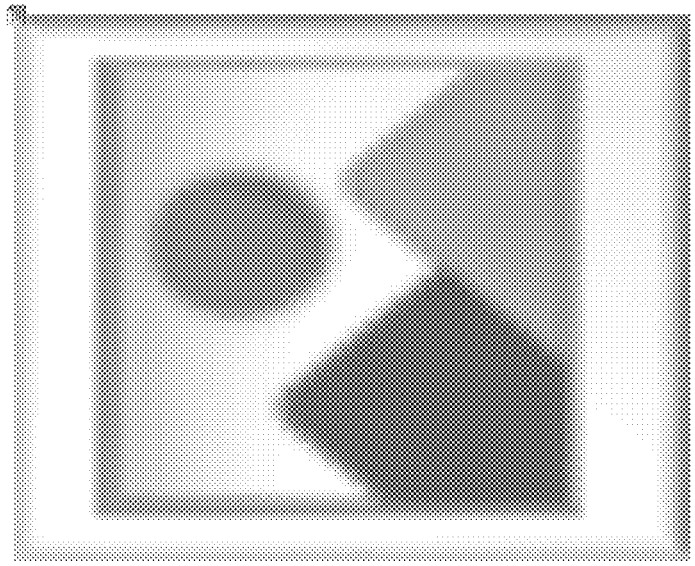
FIG. 4 is an illustration of an exemplary embodiment of a graphical user interface in accordance with an embodiment of the present invention.

As shown in FIG. 4, in accordance with an exemplary embodiment of the present invention, an uploaded image or content will go through a plurality of checks. As used herein, the terms image, graphics and content may be used interchangeably and should be interpreted to mean any form of content that is suitable for use with any embodiment of the present invention. In a preferred embodiment, four immediate checks are made: size check, resolution check, transparency check, and color check (e.g., CMYK, RGB). In order to accomplish this functionality the graphics correction engine reads and analyzes the images and then outputs feedback to the user. The graphics correction engine is also configured to provide options and functionality for modification, as well saving of the updated image.

Additionally, the graphics correction engine may be a component of a website interface or other web-based application or system that is developed to provide functionality of uploading images and saving the images in original and altered states. In this manner, the user has the ability to revert to any version of the image desired based on project need or any other requirement/desire.

In one embodiment, once an image is uploaded via the website interface of the graphics correction engine, the graphics correction engine will run a size check to test on acceptable size for optimum print quality. After running the test, the graphics correction engine will provide output in the form of information on acceptable image size, specifically whether image is too small for printing. In the case of the image being too small, a feedback note will direct the user to upload a larger image version. The feedback note will specify the maximum size the uploaded image can be printed (e.g., 2"×2" area on a pocket, 12"×12" box on the shirt back, etc.) Furthermore, the graphics correction engine will provide output in the form of help information on how to increase the image size for larger printing options.

In a preferred embodiment, the graphics correction engine is configured to automatically process the increase the image size for larger printing options. In this case, the graphics correction engine may increase the image size through one or more processes for increasing image size, such as upsampling, interpolation, nearest neighbor scaling or other scaling algorithm. One of ordinary skill in the art would appreciate that there are numerous forms of scaling algorithms that may be utilized with embodiments of the present invention, and embodiments of the present invention are contemplated for use with any scaling algorithm or other method for increasing image size. The graphics correction engine may also shrink images that are too large in a similar manner. Further, in the case of videos or other multimedia content, the processing may occur on each individual frame or other subset in order to process the content into the appropriate size/quality. Once completed, both the original and converted file will be displayed to the user, and the user will select which image to use. Once the user selects the image to use, the revised image will be saved by the graphics correction engine.

According to an embodiment of the present invention, the graphics correction engine may also be configured to run a resolution check to test acceptable resolution for optimum print quality on the image uploaded. After running the test, the program will provide output in the form of information on the resolution of the image. In the case of the file being too small/low resolution, a feedback note will direct the user to increase the resolution and upload again. Along with this note, the invention will provide output in the form of help information on how to increase the resolution size for larger printing options.

In a preferred embodiment, the graphics correction engine is configured to automatically process the increase the resolution for larger printing options. In this case, the graphics correction engine may increase the resolution through one or more processes for increasing resolution, such as resampling or other resolution enhancement algorithm. One of ordinary skill in the art would appreciate that there are numerous methods for increasing resolution of an image that may be utilized with embodiments of the present invention, and embodiments of the present invention are contemplated for use with any method for increasing resolution. The graphics correction engine may also be configured to reduce image resolution where desired. Once completed, both the original and converted file will be displayed to the user, and the user will select which image to use. Once the user selects the image to use, the revised image will be saved by the graphics correction engine.

According to an embodiment of the present invention, the graphics correction engine may be configured to run a transparency check to analyze the image and provide output in the form of information as to whether or not the image is transparent (i.e., the background box does not show). For example, an image of a tiger inside a square box would not show the white background, just the actual tiger graphic when printed. In the case of the file not being transparent, feedback text will note the image is not transparent and provide access to a module or component of the graphics correction engine to automatically convert the file into a transparent image. When this action is taken, the computer program will change attributes of the image and re-save the updated file. Both the original and converted file will be presented, and the end user will select which image to use. Once the user selects the image to use, the revised image will be saved by the program.

According to an embodiment of the present invention, the graphics correction engine may also be configured to run a color check analyzing the image and providing output information on whether the image is in CMYK format or RGB (CMYK is commonly desired for print output, however RGB is the standard for computer production/viewing.) In the case of the file not being CMYK, a feedback note will provide a link to an engine to convert the file into a CMYK file. When this action is taken, the graphics correction engine is configured to change the attributes of the image. Both the original and converted file will be displayed, and the end user will select which image to use. Once the user selects the image to use, the revised image will be saved by the graphics correction engine.

In addition to the checks run upon uploaded images, the web interface of the Graphics Correction Engine may be configured to provide a tab to view the properties of the uploaded image or content. Properties may include, but are not limited to, the image name, the image file type (jpg, bmp, png, tiff, giff), as well as raster or vector, image size (in , bytes), the horizontal resolution, the vertical resolution, aspect ratio, the width, the height, the pixel format, the transparency, and the image type (CMYK or RGB). One of ordinary skill in the art would appreciate that there are numerous properties that could be utilized with embodiments of the present invention, and embodiments of the present invention are contemplated for use with any property.

In a preferred embodiment of the present invention, the web interface of the Graphics Correction Engine will also provide a history tab to track edits/revisions to the uploaded image.

Exemplary Embodiments

Figure 5:
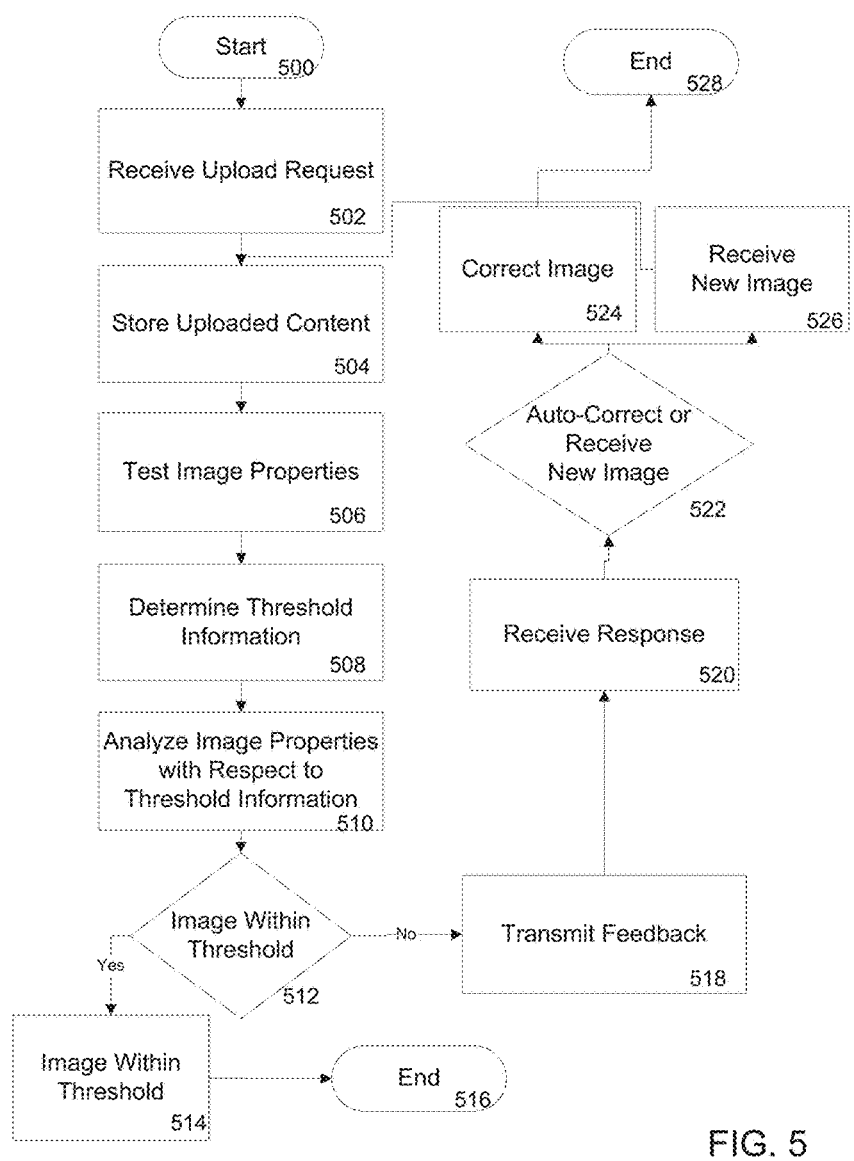
FIG. 5 is an flowchart of an exemplary method in accordance with an embodiment of the present invention.

The following is an exemplary embodiment of a method for utilization of the graphics correction engine, as shown in FIG. 5. At step 500, the process starts with a user initiating the transmission of an image or other multimedia content to the graphics correction engine. For the purposes of this example, we will assume the upload is an image.

At step 502, the graphics correction engine received the upload request and associated image. In a preferred embodiment, the communications means of the graphics correction engine would receive the image over one or more networks, most probably the Internet.

At step 504, the graphics correction engine has received the image and the graphics correction engine affects the storage the image. Depending on the configuration of the graphics correction engine, the image may be stored to a storage medium or data store. Alternatively, the graphics correction engine may be configured to store the image in a memory or other low latency storage medium with the knowledge that the graphics correction engine will soon be taking further action on the image. Keeping the image in memory or low latency storage mediums (e.g., solid state drives) allows for the processing time to be lowered as it takes less time for the graphics correction engine to move the relative data to and from the processor in this manner.

At step 506, the graphics correction engine begins to check the image properties. As described above, this may include one or more of a check on the images format (vector or raster), the image dimensions (e.g., size, width, height), the image resolution and the image transparency. During this test, the graphics correction engine may be configured to store the property information as determined by the tests.

At step 508, the graphics correction engine retrieves threshold information from one or more sources, such as a database, data store or storage medium containing threshold information. The threshold information may vary based on intended usage of the image.

At step 510, the graphics correction engine analyzes the properties determined in step 506 with respect to the threshold information retrieved in step 508. The graphics correction engine may be configured to identify whether there are any properties of the image that are outside the threshold ranges as identified by the graphics correction engine. Where a property exceeds or fails to reach a minimum threshold, an error may be thrown, a message sent to the user, the graphics correction engine may be configured to automatically correct the property, or any combination thereof may occur. In a preferred embodiment, the system may be configured to first present the user with information as to which properties are outside the thresholds and provide the user the ability to select the properties the user wants the system to automatically correct (whether individually or collectively). In this manner, the user is in control of which properties should be automatically corrected by the system and further allows the user the ability to upload a replacement image in the alternative.

In the present example, the system determines, at step 512 whether the image properties are within the threshold limits identified in the threshold information. If the image properties are within the threshold limits, the system proceeds to step 514 and the image may be utilized for its intended purpose. The process then terminates at step 516. If the image properties are outside the threshold limits, the process continues to step 518.

At step 518, the graphics correction engine transmits any feedback generated by the graphics correction engine to the user initiating the upload. As noted above, this can be done in a variety of formats in a variety of manners. The feedback may be displayed to the user via a GUI or other human readable format.

At step 520, the user has determined an action based on the feedback provided to the user and sends that action to the system for processing. In certain embodiments, the feedback may have included graphic correction suggestions and provided the user the ability to select which corrections should be made. Ideally, the user will choose to correct the image such that the image properties are all within the thresholds determined previously.

At step 522, the system determines if the response from the user was a decision by the user to allow the system to automatically correct the image through the use of the graphics correction engine and its components or if the response for the user was to provide a new image in which the user had corrected the issues or provided a new image for review.

At step 524, the user has decided to allow the system to auto-correct the image and the system corrects the image in a manner consistent with the user's response. In certain instances, the user may have made the corrections himself/ herself as outlined in the feedback provided by the system and then simply upload the corrected image. In other embodiments, the user will select which portions of the image the system should set about automatically updating, as outlined in the feedback provided to the user. Once the image is corrected, the process terminates at step 528. Optionally, the system may revert to step 504 to store the updated image and retest the image properties for compliance with the thresholds.

If the user has decided to upload a new image, the process proceeds to step 526. In a preferred embodiment, the newly uploaded image is then put through the testing process again and the system reverts back to step 504 with respect to the newly uploaded image. Alternatively, the system may assume the user's corrections were acceptable and terminate the process.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A web-based graphics correction engine, the engine comprising:
   a content testing module comprising computer-executable code stored in non-volatile memory, said content testing module configured to analyze content properties consisting of size, color, transparency, resolution, positioning, layering, sharpness, and readable text;
   a content processing module comprising computer-executable code stored in non-volatile memory, said content processing module configured to alter said content properties, said alteration consisting of extrapolation, interpolation, noise reduction, color enhancing, enlarging of content, shrinking of content, and format changes;
   a communications means comprising computer-executable code stored in non-volatile memory,
   wherein said content testing module, said content processing module and said communications means are operably connected; and
   wherein the content testing module, content processing module and communications means are configured to collectively perform the steps of:
   receiving a content upload, from a user, at a graphics correction engine, wherein said graphics correction engine comprises computer-executable code stored in non-volatile memory and a processor;
   storing, in said graphics correction engine, content associated with said content upload;
   determining a threshold range for said properties, said range having a minimum threshold and a maximum threshold;
   analyzing said properties to determine whether they fall within said range; and
   transmitting feedback, from said graphics correction engine, to said user, wherein said feedback is based at least in part on said analysis,
   wherein said graphics correction engine is a component of a website interface or other web-based application having functionality to upload and save an image in original and altered states.

2. The web-based graphics correction engine of claim 1, wherein said content comprises an image.

3. The web-based graphics correction engine of claim 1, wherein the content testing module, content processing module and communications means are additionally configured to collectively perform the step of determining if said content is in an appropriate format.

4. The web-based graphics correction engine of claim 1, wherein the content testing module, content processing module and communications means are additionally configured to collectively perform the step of determining if said content is in an appropriate transparency.

5. The web-based graphics correction engine of claim 1, wherein the content testing module, content processing module and communications means are additionally configured to collectively perform the step of storing said properties in memory.

6. The web-based graphics correction engine of claim 1, wherein said threshold information is retrieved from a data store.

7. The web-based graphics correction engine of claim 1, wherein said feedback is provided to the user in the form of a webpage.

8. A web-based method for providing graphics correction, the method comprising the steps of:
  receiving a content upload, from a user, at a graphics correction engine, wherein said graphics correction engine comprises computer-executable code stored in non-volatile memory and a processor;
  storing, in said graphics correction engine, content associated with said content upload;
  analyzing, at said graphics correction engine, properties of said content, wherein said properties consist of size, color, transparency, resolution, positioning, layering, sharpness, and readable text;
  altering said properties, at said graphics correction engine, said alteration consisting of extrapolation, interpolation, noise reduction, color enhancing, enlarging of content, shrinking of content, and format changes;
  determining, at said graphics correction engine, a threshold range for each of said properties, said range having a minimum threshold and a maximum threshold;
  analyzing, at said graphics correction engine, said properties to determine whether they fall within said range; and
  transmitting feedback, from said graphics correction engine, to said user, wherein said feedback is based at least in part on said analysis.

9. The web-based method of claim 8, further comprising the step of determining if said content is in an appropriate format.

10. The web-based method of claim 8, further comprising the step of determining if said content is in an appropriate transparency.

11. The web-based method of claim 8, further comprising the step of storing said properties in memory.

12. The web-based method of claim 8, wherein said threshold information is retrieved from a data store.

13. The web-based method of claim 8, wherein said feedback is provided to the user in the form of a webpage.

14. The web-based graphics correction engine of claim 1, wherein said uploaded content is a video and said image is a frame of said video.

15. The web-based graphics correction engine of claim 1, wherein said graphics correction engine runs a size check on an uploaded image to determine whether said image is an acceptable size for optimum print quality, and automatically resizes the image to achieve said acceptable size.

16. The web-based graphics correction engine of claim 1, wherein said graphics correction engine runs a resolution check on an uploaded image to determine whether said image has an acceptable resolution for optimum print quality, and automatically adjusts the resolution to achieve the acceptable resolution.

17. The web-based graphics correction engine of claim 1, wherein said graphics correction engine runs a transparency check on an uploaded image to determine whether said image is transparent, and automatically converts the image into a transparent image.

18. The web-based graphics correction engine of claim 1, wherein said graphics correction engine runs a color check on an uploaded image to determine whether said image is in CMYK (cyan, magneta, yellow, and key) format or RGB (red, green, blue) format, wherein said graphics correction engine provides an option to convert the image file into a CMYK image.

* * * * *